United States Patent
Mills et al.

(10) Patent No.: US 8,370,178 B1
(45) Date of Patent: Feb. 5, 2013

(54) SYSTEMS AND METHODS FOR MARKETING AND/OR SERVICING PERSONAL PROPERTY INSURANCE

(75) Inventors: Steven Carl Mills, San Antonio, TX (US); Daniel A. Chavez, San Antonio, TX (US); Tony Noriega, San Antonio, TX (US); Sandra Lynn Sherman Sausman, Shavano Park, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 631 days.

(21) Appl. No.: 11/872,465

(22) Filed: Oct. 15, 2007

(51) Int. Cl.
*G06Q 40/00* (2012.01)
(52) U.S. Cl. .............................. 705/4; 705/35
(58) Field of Classification Search ................. 705/4, 35
See application file for complete search history.

(56) References Cited

U.S. PATENT DOCUMENTS

| | | | |
|---|---|---|---|
| 6,904,410 | B1 | 6/2005 | Weiss et al. |
| 2002/0022976 | A1* | 2/2002 | Hartigan ........................... 705/4 |
| 2003/0023462 | A1 | 1/2003 | Heilizer |
| 2003/0023610 | A1* | 1/2003 | Bove et al. ..................... 707/101 |
| 2004/0030565 | A1* | 2/2004 | Hendry, Jr. ........................ 705/1 |
| 2004/0143464 | A1* | 7/2004 | Houle et al. ....................... 705/4 |
| 2006/0100912 | A1* | 5/2006 | Kumar et al. ..................... 705/4 |
| 2006/0224462 | A1* | 10/2006 | Brezenoff ....................... 705/26 |
| 2007/0136104 | A1* | 6/2007 | Bowen et al. ..................... 705/4 |
| 2008/0065427 | A1* | 3/2008 | Helitzer et al. ................... 705/4 |

OTHER PUBLICATIONS

By Matthew Elder of,The Gazette. (Jun. 23, 1986). You can save on home-insurance premiums; A higher deductible makes sense but don't sacrifice coverage for economy. The Gazette, pp. 10-D10. Retrieved Sep. 21, 2012.*

Young, Dale and Benamati, John; "Differences in Public Web sites: The Current State of Large U.S. Firms"; Journal of Electronic Commerce Research; 2000; pp. 94-105; vol. 1 No. 3.

Borden, Sara and Sarkar, Asani; "Securitizing Property Catastrophe Risk"; Current Issues in Economics and Finance; Aug. 1996; vol. 2 No. 9.

Sato, Setsuya and Hawkins, John; "Electronic Finance: An Overview of the Issues"; Nov. 2001; pp. 1-12; BISPapers No. 7; Bank for International Settlements—Basel, Switzerland.

Kuttner, Kenneth N. and McAndrews, James J.; "Personal On-Line Payments"; Economic Policy Review; Dec. 2001; pp. 35-50; vol. 7, No. 3.

"Personal Inland Marine Policy"; MMG Insurance; http://www.mainemutual.com/inland.htm.

"Inland Marine Coverage"; http://www.schinnerer.com/product_info/design_firms/inmarine.html; Copyright 2005 Victor O. Schinnerer & Company, Inc.

"Personal Propetry Inland Marine Policy"; Erie Insurance; http://www.erieinsurance.com/ProdServ/PersProp/InlandMarine.htm; Copyright 1997-2007 Erie Indemnity Co., Erie, PA.

"Personal Articles Floater"; AON Corporation; http://www.aon.com/ca/en/individuals/home_property/specialty_coverage/personal_articles.jsp; Copyright 2001-2006 Aon Corporation, Chicago, Illinois.

(Continued)

*Primary Examiner* — Kito R Robinson
(74) *Attorney, Agent, or Firm* — Kilpatrick Townsend & Stockton LLP

(57) ABSTRACT

Insurance coverage on valuable personal property ("VPP") can be marketed and/or serviced through an expert system that interacts with a user through a web site and web browser. VPP coverage tends to have many facets and complexities, and a system can be used to explain the various complexities and to guide said user through the process of selecting coverage, obtaining a quote, and purchasing said policy. The system can provide various forms of user education, such as graphical and/or text screens that explain features of coverage, can also provide said user with a linear process flow for those tasks that can be accomplished simply, and can involve a human representative for more complicated tasks.

18 Claims, 9 Drawing Sheets

OTHER PUBLICATIONS

"Personal Articles Floaters Insurance 101"; Travelers of New Jersey; http://www.travelersnj.com/buy_insurance/personal_articles_101.asp; Copyright 2007 Travelers of New Jersey.

"Home Insurance: Scheduled Personal Property Coverage"; Allstate; http://www.allstate.com/home-insurance/scheduled-personal-property-coverage.aspx; Copyright 2007 Allstate Insurance Company.

"Invaluable Protection for the Things you Cherish"; Chubb Personal Insurance; http://www.chubb.com/personal/masterpiece_adv_vac.jsp; Copyright Chubb & Son, a division of Federal Insurance Company.

INSURE.COM, "Smoke but No fire where State Farm abandons standard fire ratings"; retrieved from the Internet: <<http://www.insure.com/articles/homeinsurance/statefarm-fire.html>>, Last Updated Feb. 13, 2003 ).

ISO.COM, (http://web.archive.org/web/20000416035515/www.iso.com/catalog/docs/prod036.htm) Apr. 16, 2000(http://web.archive.org/web/20000816110511/www.iso.com/catalog/docs/prod002.htm) Aug. 16, 2000, 6 pages total.

\* cited by examiner

SYSTEMS AND METHODS FOR MARKETING AND/OR SERVICING PERSONAL PROPERTY INSURANCE

CROSS-REFERENCE TO RELATED APPLICATIONS

This application is related by subject matter to the inventions disclosed in the following commonly assigned applications, the entirety of which are hereby incorporated by reference herein: U.S. patent application Ser. No. 11/872,445, U.S. patent application Ser. No. 11/872,454, U.S. patent application Ser. No. 11/872,480, and U.S. patent application Ser. No. 11/872,492, each filed on Oct. 15, 2007, and each entitled "Systems and Methods for Marketing and/or Servicing Personal Property Insurance".

BACKGROUND

Web sites can be used to market insurance policies. An insurance buyer can go to a web site to obtain a price for an insurance policy, and to apply for a policy. The web site is typically governed by an expert system that collects information from the buyer and guides the buyer through the process of applying for insurance.

The web site medium has been suited to marketing certain types of insurance, such as automobile and term life insurance. These types of insurance are relatively simple financial instruments, in the sense that the buyer typically has a clear understanding of what he or she is purchasing, and the policies can be priced and/or underwritten with a small amount of information. For example, most drivers are familiar with the basic automobile insurance concepts (e.g., the difference between liability, collision, and comprehensive coverage, and the meaning of a deductible), and a policy can be priced based on the buyer's address, make/model/year of vehicle, and driving record. Thus, the process of providing a buyer with a quote and taking an application for an automobile policy, is relative simple.

Some types of insurance, however, are complex in the sense that they involve a large number of factors and choices. Valuable personal property ("VPP") insurance (which is sometimes referred to as "personal articles" insurance or, for historical reasons, "inland marine" insurance) is a type of insurance that often involves complexities in taking an application or quoting a price. On-line buyers often become bewildered by web transactions that become complicated. Such buyers may decide to abort the transaction before completing it, or may complete the transaction incorrectly.

SUMMARY

A web site may be used to market and/or service VPP insurance policies. The web site can guide a user through the process of choosing coverage, estimating value of the property to be covered, and obtaining the user's agreement to terms of the coverage. The web site may provide various types of consumer education to assist in the process of shopping for coverage. The web site may attempt to provide an on-line insurance-buying experience in the form of a linear flow, in order to avoid complicating the insurance-buying process for the user.

This summary is provided to introduce a selection of concepts in a simplified form that are further described in the detailed description. This summary is not intended to identify key features or essential features of the claimed subject matter, nor is it intended to be used to limit the scope of the claimed subject matter.

DETAILED DESCRIPTION

Figure 1:
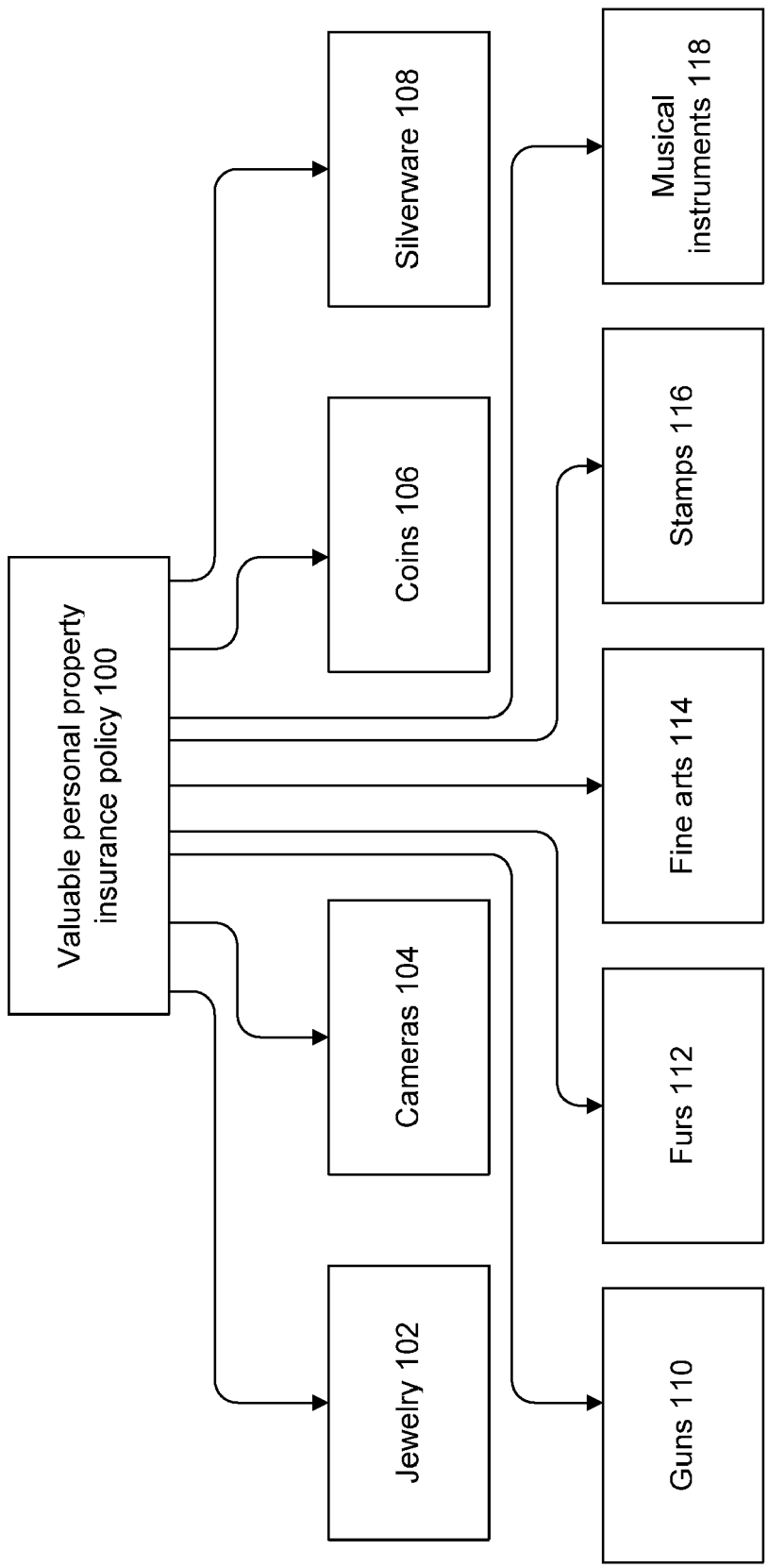
FIG. 1 is a block diagram of a VPP insurance policy, and various types of property that could be insured under the policy.

Certain types of insurance have been marketed and serviced through on-line channels, such as automobile insurance and term life insurance. These types of insurance are generally simple to quote and write, so the on-line channel has been well-suited to marketing and servicing these types of insurance. However, VPP insurance typically has many more options and variables than automobile or term life insurance. Different types of property may have different types of underwriting concerns. For example, fire is more of a concern for furs than it is for jewelry. Additionally, there may be various different options as to how to insure the property (e.g., jewelry may be insurable either per-item or as a collection). While a human insurance agent typically understands the nuances in providing insurance on personal property, using an expert-system-driven web site to replace the knowledge and experience of a human agent creates a challenge. In theory, the various complexities of personal property insurance can be written into a computer program, and the program can be designed to ask the user questions that will determine the right coverage. However, computer users may become frustrated or bored with a web site that is too complex. When users become bored or frustrated, they generally try to call or meet with a human representative instead of using the web site. Thus, a poorly-designed web site may be underutilized, and may also overburden human resources. To encourage acceptance of the web site channel for marketing and servicing VPP insurance, some decisions can be made about what information to present to the user and how to present it in a manner that encourages acceptance of the web site.

A web site to market and/or service valuable personal property insurance may be designed with features that educate the user about the nature of the insurance. Such education may increase the likelihood that the user will complete the transaction using the web site. Users may have a greater tolerance for being educated if the educational content includes pictures. Additionally, such a web site may seek to maintain a linear flow—moving forward toward a quote and toward the purchase of a policy—rather than moving the user back and forth through various parts of the process. Moreover, such a system can be designed to direct the user to a human representative for guidance in those parts of the process that exceed a certain threshold of complexity. A representative may be able to follow the transaction through a set of screens that look much like the user's web site, but the representative—who is likely to be more experienced with the system than the average consumer—may be given additional functionality to drive a transaction forward, even though this additional functionality may not be available through the consumer web site. Thus, the scarce resources of human representatives can be used in those situations where they can provide the most value, while allowing users to complete simple transactions on-line.

Referring now to the drawings, FIG. 1 shows a VPP policy 100, and various example types of property that can be insured under such a policy. VPP policy 100 may be written to cover items such as jewelry 102, cameras 104, coins 106, silverware 108, guns 110, furs 112, fine arts 114, stamps 116, or musical instruments 118. Other types of personal property could also be covered.

The subject matter described herein can be used to market a VPP policy to a buyer through a web site, and can also assist the buyer in determining what type of coverage the buyer may wish to have. Different categories of personal property may have complexities as to the nature of the insurance, and the subject matter described herein can be used to guide the buyer through these complexities. For example, depending on the value of the items to be insured, jewelry 102 may be insurable either on a per-item basis or as a collection, and the buyer can be advised as to these different options to assist the buyer in making a decision about how to insure such jewelry. As another example, coverage for furs 112 might not cover furs of endangered species, and the buyer can be advised of this fact to assist in making a buying decision. For certain types of property (e.g., jewelry), a description of the property may be collected as part of the process of applying for insurance, and the user can be prompted to provide such a description as part of the application process for insuring such types of property. These aspects and others are described subsequently.

Figure 2:
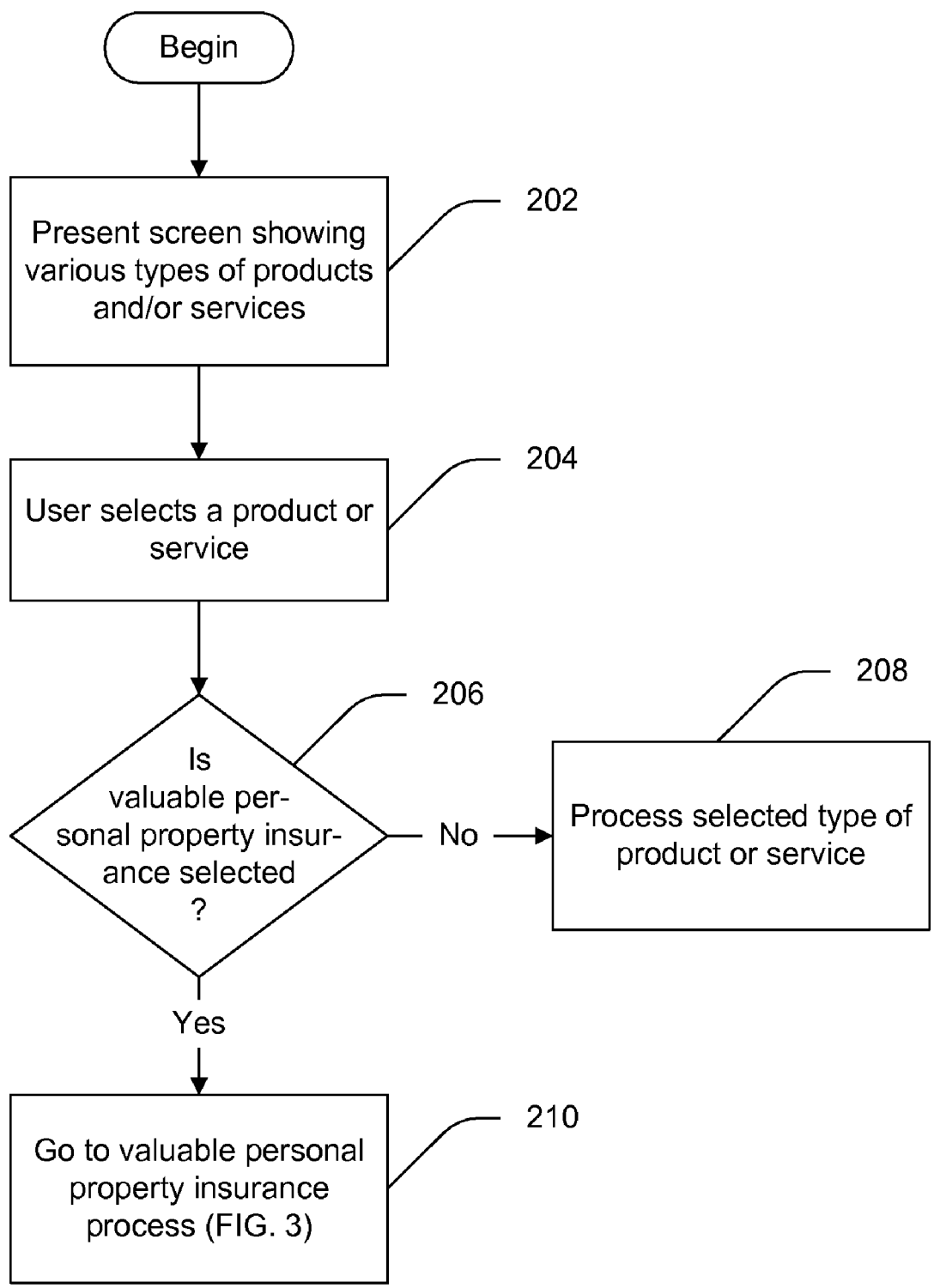
FIG. 2 is a flow diagram of a process by which a user may choose to explore and/or purchase VPP insurance.
Figure 3:
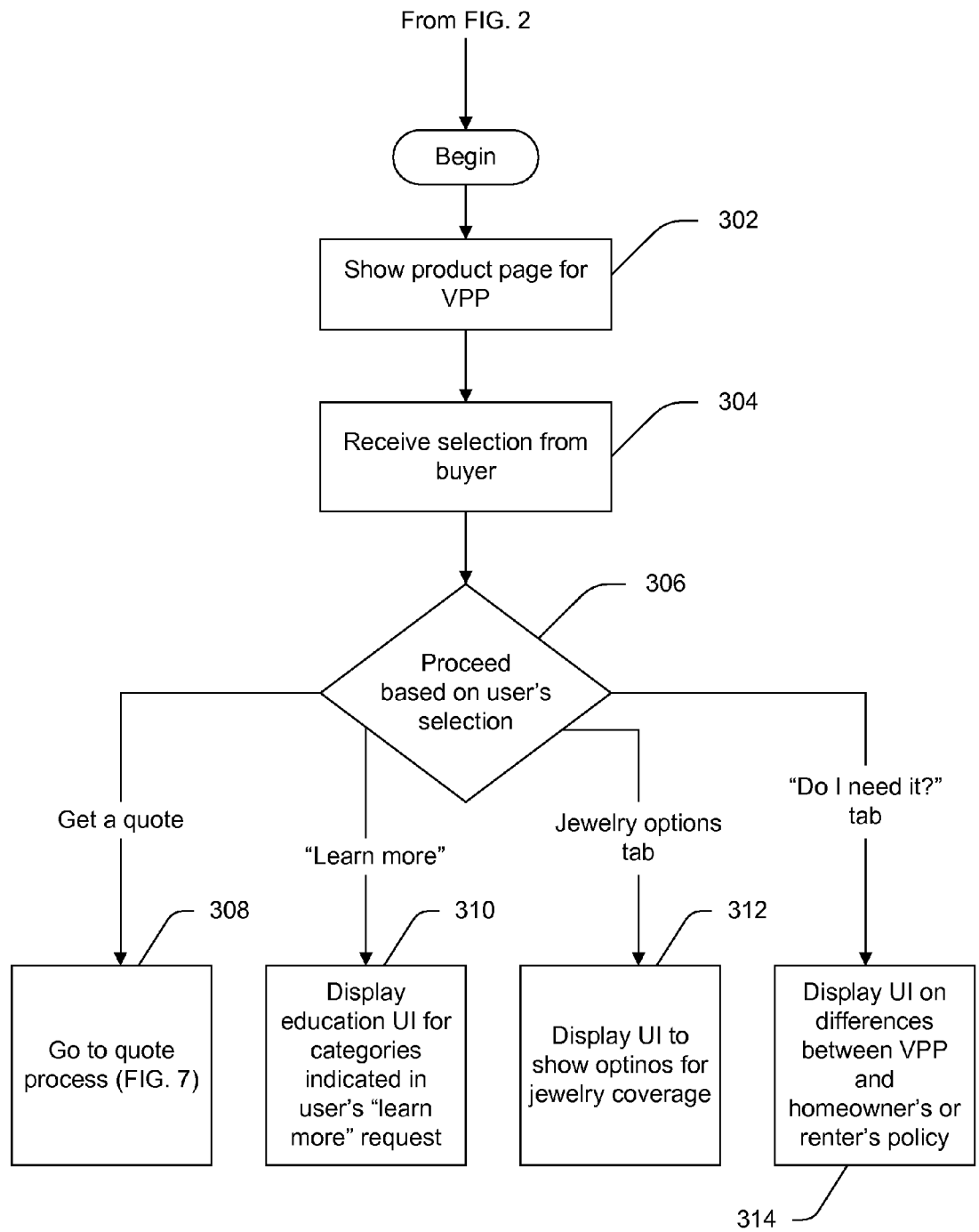
FIG. 3 is a flow diagram of a process that may be used to interact with a potential buyer concerning VPP insurance.
Figure 4:
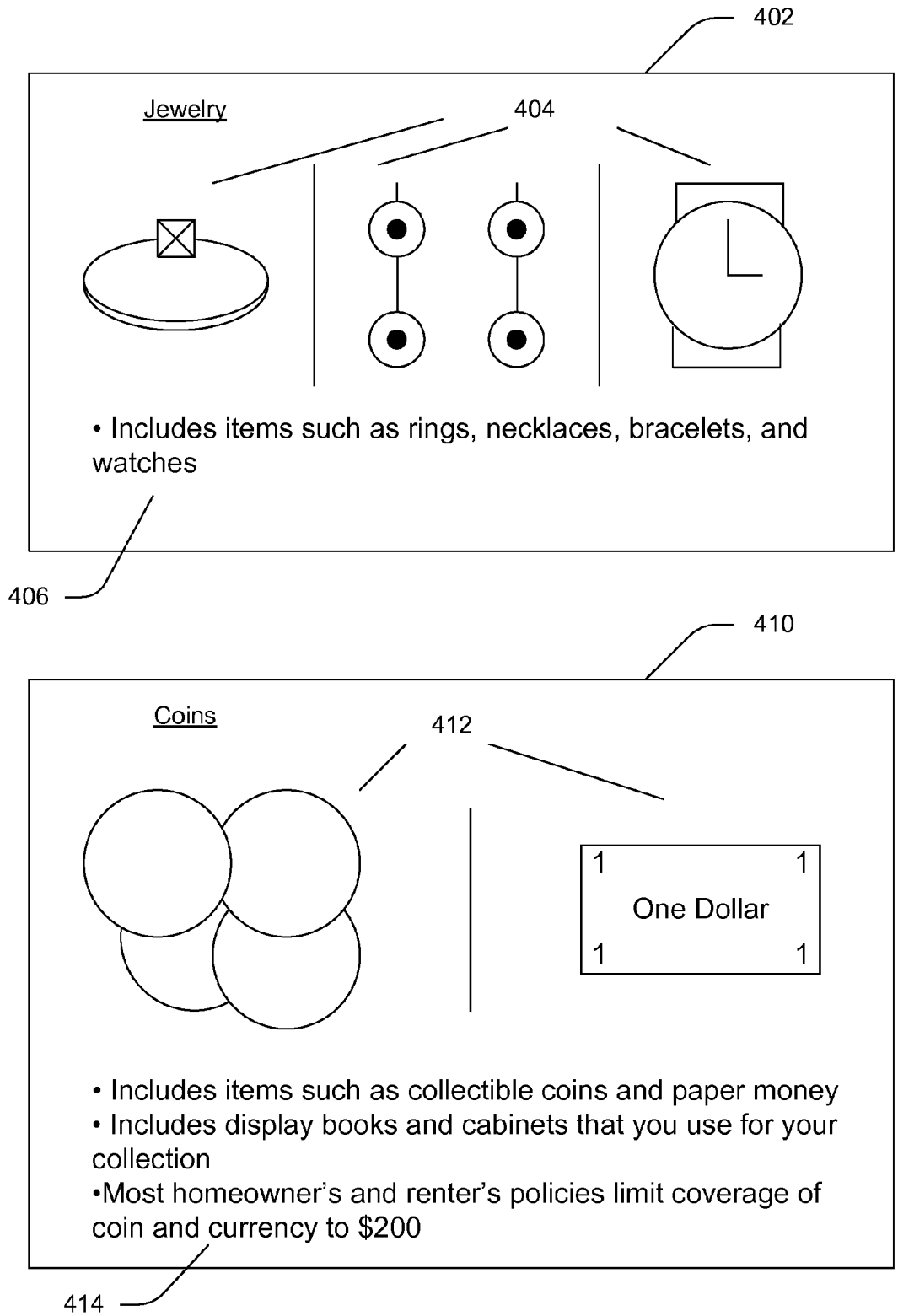
FIG. 4 is a diagram of an example user interface that provides consumer education about VPP coverage.
Figure 5:
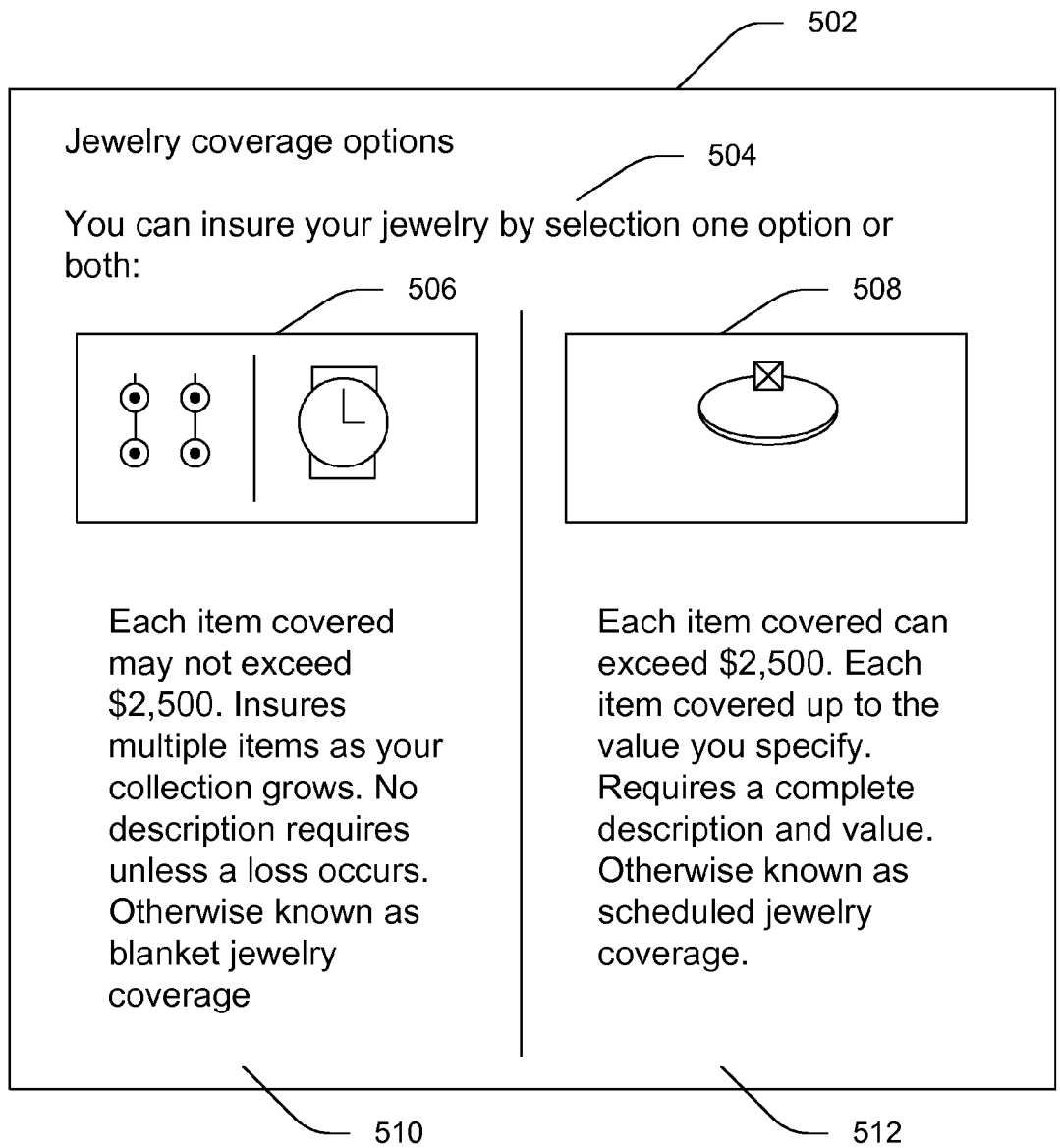
FIG. 5 is a diagram of an example user interface that provides consumer education about jewelry coverage.
Figure 6:
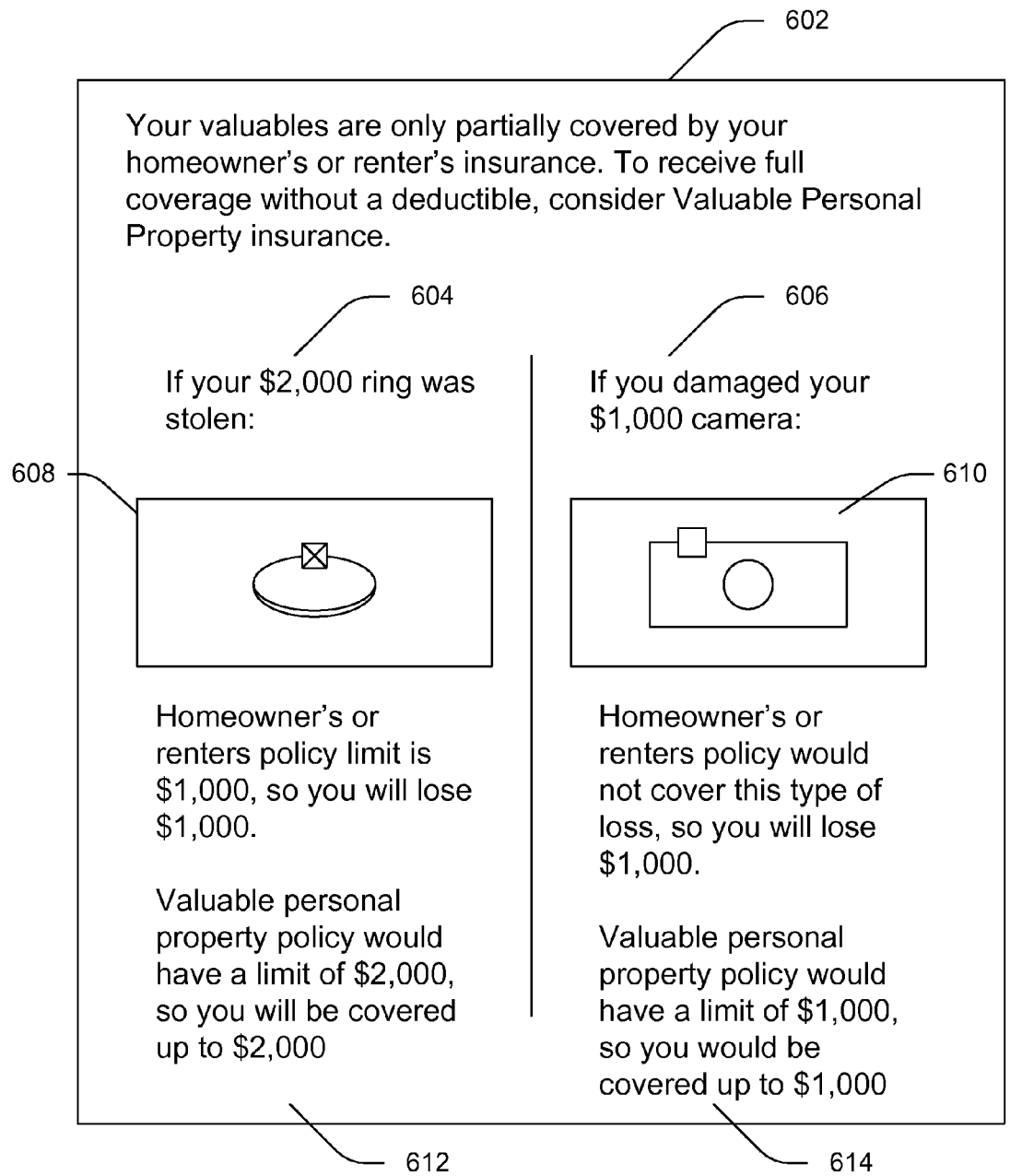
FIG. 6 is a diagram of an example user interface that provides consumer education on some differences between covering personal property through a homeowner's insurance policy and covering personal property through a VPP policy.

FIGS. 2-3, and 7-8 are flow diagrams of various processes that may be used in the course of marketing and/or servicing a VPP insurance policy. (The intervening FIGS. 4-6 show example user interfaces that may be displayed in the course of performing these processes.) The processes shown in these figures could be performed, for example, by an "expert system" that is used to drive a consumer web site. For example software could be run on a server that performs the stages shown in the flow diagrams by interacting with a web browser on a client machine. However, the process shown in these flow diagrams could also be performed in any other system or context. Additionally, each of the flow diagrams in FIGS. 2-3 and 7-8 shows an example in which stages of a process are carried out in a particular order, as indicated by the lines connecting the blocks, but the various stages shown in these diagrams can be performed in any order, or in any combination or sub-combination.

Figure 7:
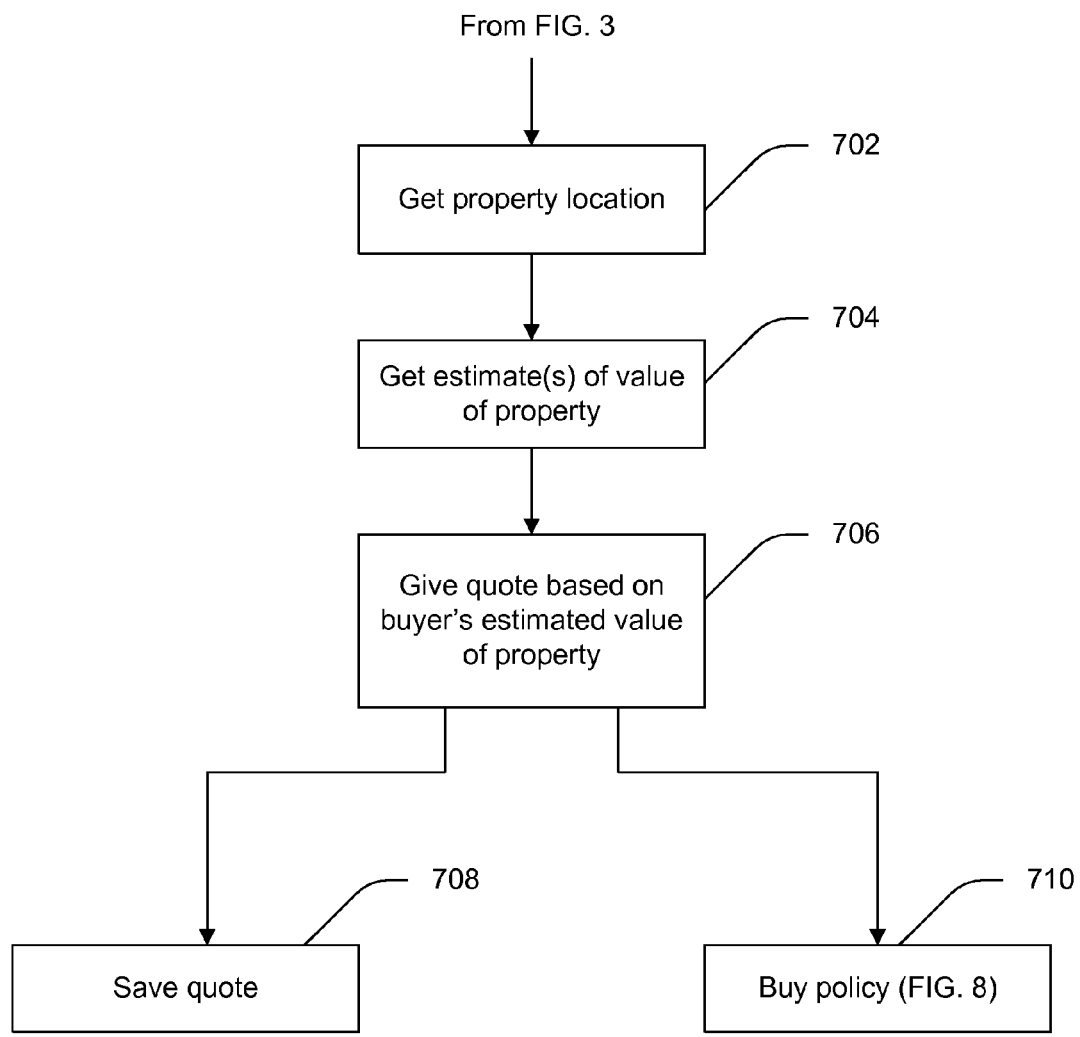
FIG. 7 is a flow diagram of a process of providing a quote for the cost of VPP insurance to a potential buyer.
Figure 8:
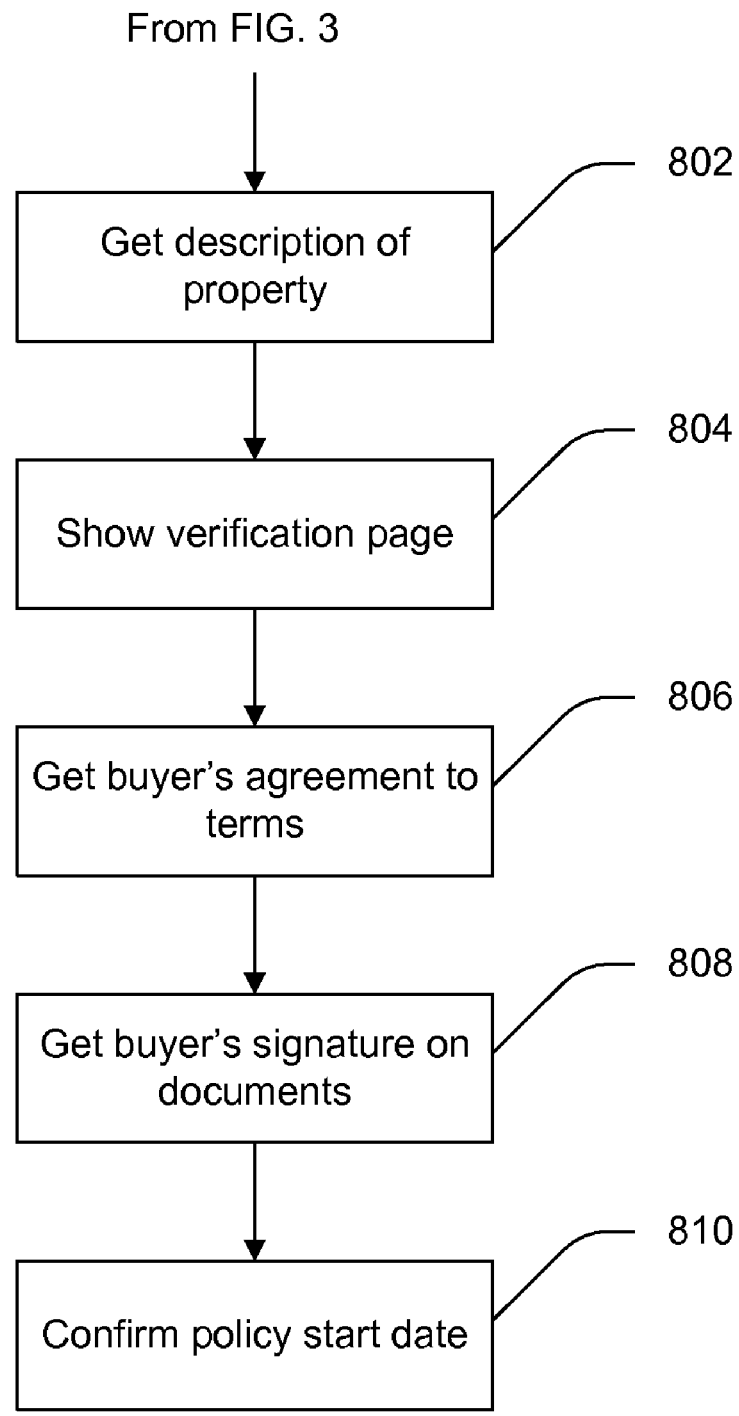
FIG. 8 is a flow diagram of a process of assisting a buyer in buying quoted VPP coverage.

FIG. 2 shows a process by which a user may choose to explore and/or purchase VPP insurance. For example, such a process may be implemented on on the web site of a financial services provider. The web site (at 202) may present the user several options for different types of products and/or services to investigate, such as various types of products/services for banking, investment, insurance, etc. VPP insurance may be listed among the insurance options. At 204, the user selects one of the products and/or services. If the product and/or service selected is VPP insurance (as determined at 206), then user (at 208) is taken to a process that markets and/or services VPP insurance policies. Examples of such processes are shown in FIGS. 3, 7, and 8. If the user selects some product and/or service other than VPP insurance (as determined at 206), then the user may be taken to a process relating to such other product and/or service (at 210).

FIG. 3 shows a process that may be used to interact with a potential buyer concerning VPP insurance. At 302, a product page for VPP is shown to a potential buyer. The product page may, for example, show the various types of items for which a buyer could purchase VPP insurance, such as the various items labeled 102-118 in FIG. 1. In one example, the product page shown at 302 may have an image relating to each of the categories—e.g., a photograph of a ring for jewelry 102, a photograph of forks and spoons for silverware 108, etc. Additionally, the product page shown at 302 may include links that allow the buyer to "learn more" about each of the categories. Also, the product page shown at 302 may have tabs with labels such as "jewelry options" (which, when clicked, may lead the buyer to an explanation of some specifics about jewelry coverage) and "do I need it?" (which, when clicked, may lead the buyer to an explanation of protections that are provided by VPP coverage). Jewelry is a particularly common type of item for which people purchase VPP insurance, and thus an explanation of the options for jewelry coverage may merit its own tab on the product page. However, any tab(s) could be used, and these tab(s) could lead to any type of information.

In addition to the options discussed previously, the buyer may also be given the option to begin the process of obtaining a quote for VPP insurance. Thus, at this point, the buyer has the option to learn more about the various categories of insurable items, to see the options for jewelry coverage, to learn about whether he or she would want to purchase VPP coverage, or to obtain a quote. At 304, the buyer's selection is received. At 306, it is determined which selection the buyer has made. The process then proceeds to 308, 310, 312, or 314 depending on what the buyer has chosen to do.

If the buyer chooses to start the quote process, the process proceeds to 308, where the example quoting process shown in FIG. 7 is begun.

If the buyer chooses to learn more about a particular type of insurable item, then an education user interface ("UI") about a given item is displayed to the buyer (at 310). Examples of such education UIs are discussed subsequently in connection with FIG. 4. The UI may take the form of a separate page, browser tab, pop-up window, etc.

If the buyer chooses the "jewelry options" tab, then a UI is displayed to the buyer showing various different options for jewelry coverage (at 312). An example of a UI that explains options for jewelry coverage is discussed subsequently in connection with FIG. 5.

If the buyer chooses the "do I need it?" tab, then a UI is displayed to the buyer providing information about what VPP insurance covers and/or the differences between VPP insurance and other types of insurance (at 314). An example of a UI that may be displayed in response to the buyer's choosing the "do I need it?" tab is discussed subsequently in connection with FIG. 6.

FIGS. 4-6 show examples of the UIs referred to in connection with blocks 310, 312, and 314, as previously discussed.

FIG. 4 shows some example consumer education UIs. For example, a buyer may indicate (at 304, discussed previously in connection with FIG. 3) that he or she wishes to learn about jewelry coverage. In this case, the buyer is provided with a UI that includes jewelry coverage education content 402. Jewelry coverage education content 402 may include, for example, images 404 of various types of jewelry (such as a diamond ring, earrings, or a watch, as shown in the example of FIG. 4). Jewelry coverage education content 402 also may include a verbal explanation 406 of what jewelry includes. In the example of FIG. 4, written explanation 406 states: "Includes items such as rings, necklaces, bracelets, and watches."

Another example of information that may be provided in the form of a consumer education UI is coin-coverage education content 410. Coin-coverage education content 410 may include images 412 of example items that may be insurable as coins. Images 412, in this example, show both metal coins and paper bills. The buyer may not be aware that the "coins" that are insurable in a VPP insurance policy include both metal coins and paper money, and showing this image may serve to educate the buyer in this regard. Additionally, coin-coverage education content also may include written explanation 414, which may further explain the nature of coverage. The consumer education UI may be used to assist said user in learning about the nature of the coverage that can be provided. Educating the consumer in this manner may enhance a buyer's experience with the web site and may increase said user's acceptance of the process implemented by the web site, thereby reducing the chance that the buyer will abort the process and call a human service representative. The use of images as part of the consumer education content may help to create acceptance of the material by the buyer, although any type of content may be used to educate the buyer.

FIG. 5 shows an example of a UI that explains jewelry coverage. As previously noted, jewelry is a common type of property for which VPP insurance is purchased. Thus, in a system that implements the subject matter described herein, there may be more explanatory content about jewelry coverage than about other types of coverage (although the subject matter described herein can describe coverage of any types of property, in any proportions to each other).

The UI shown in FIG. 5 includes jewelry-coverage-explanation content 502. Jewelry-coverage-explanation content 502, may include text 504 explaining different options for jewelry coverage—e.g., that jewelry may be covered as a collection and/or as individual items. Jewelry-coverage-explanation content 502 may also include images 506 and 508, and textual explanations 510 and 512, which further explain differences between collection and individual coverage on jewelry items. For example, collection coverage may have a per-item value limit, while individual coverage may allow each item to be insured for a higher value. These types of explanations, or others, could be provided as part of jewelry-coverage-explanation content 502.

FIG. 6 shows an example of a UI that can be displayed to a buyer in response to the buyer's selection of a "do I need it?" tab. The UI shown in FIG. 6 includes explanatory content 602, which explains differences between VPP insurance and coverage for personal property under a homeowner's or renter's insurance policy. Many insurance buyers are aware that a homeowner's insurance policy provides some coverage for personal property, and explanatory content 602 may be used to educate a potential buyer about what a VPP insurance policy could offer that would be different from personal property coverage under a homeowner's or renter's insurance policy.

Explanatory content 602 may include examples 604 and 606. Each of these examples, in turn, may include images 608 and 610, and text 612 and 614. Text 612 and 614 may offer examples about differences concerning coverage limits for the different types of policy and/or types of losses that would be covered under the different types of policies (e.g., a VPP policy may cover breakage, while a homeowner's or renter's policy may not). On-line buyers tend to react well to content that has images as well as text, so images 608 and 610 may be used to increase user acceptance of the content, which makes it less likely that a buyer would want to talk with a human representative.

As noted previously, if a buyer chooses to start a quote process at 304 (as shown in FIG. 3), then an example quote process, such as that shown in FIG. 7, may be used. For example, a buyer may be taken to one or more screens that implement a quote process, such as that shown in FIG. 7.

In FIG. 7, the location of the personal property to be insured is obtained (at 702). For example, the buyer may be prompted to enter an address at which the property to be insured is located. Since many types of personal property are movable (e.g., jewelry, furs, cameras, etc.), the location of the property may refer to the address at which the property is normally located, the user's home address, etc. As another example, the buyer may already have an insurance policy, such as a homeowner's or renter's insurance policy, with the company (or other organization) that is to insure the personal property. If the buyer is already a policyholder with that company or organization, then data records relating to the homeowner's or renter's policy can be consulted and the location of the property can be retrieved from those records. In one example, a drop-down menu showing one or more addresses associated with the buyer can be presented, and the buyer can be given a chance to choose an address from the drop-down menu, although any mechanism for collecting a property location can be used. Some buyers may have more than one address on record (e.g., if the buyer has moved, or tends to move, between different addresses), so the drop-down menu could show more than one address for the buyer, although it is also possible that the drop-down menu would show a single address.

At 704, one or more estimates of the value of the personal property to be insured are obtained from the buyer. For example, if the buyer has indicated that he or she wishes to insure jewelry, the buyer may be asked to enter the total value of jewelry to be insured. The estimate obtained can be viewed as an initial estimate, since the estimate is subject to being updated, as described subsequently in connection with FIG. 8. If the buyer has indicated that he or she wishes to insure personal property in more than one category (e.g., jewelry, furs, and cameras), then the buyer may be asked to enter the total value of property in each category. For example, the buyer can be presented with a list of categories, with a box next to each category into which the buyer may enter the estimated value of property in that particular category.

At 706, the buyer is given a quote (or price) of a premium on the property to be insured. The quote may be calculated based on factors such as the value of property to be insured, the type of property, and the location of the property, although other factors may be used. One example of such an other factor is a fire rating. A fire rating can be used in the insurance underwriting field to reflect factors such as the structure of a building in which insured property is located (e.g., wood frame versus steel frame), the proximity of the property to the fire department, or other factors. A fire rating can be provided by a third-party service. Fire ratings are often applicable to insurance on fine arts, although a fire rating can be applied to other types of insurance. When a fire rating applies, a human service representative may, at some point, become involved in the process of quoting and/or writing insurance on an item of personal property, since obtaining and applying a fire rating may be more complicated than using other factors of the rating.

After the quote has been obtained, the buyer may be able to choose to save the quote (at 708), or proceed to buy the quoted coverage (at 710). For example, the buyer may be presented with on-screen buttons marked "save" or "buy", which take the buyer to the appropriate process.

If the buyer chooses to save the quote, the buyer may be prompted to name the quote. The quote, and its assigned name, may be stored or persisted together (e.g., in a data store, a database, etc.), and there may be data that associates the quote with the name. Thus, the quote can later be retrieved based on its assigned name.

If the buyer chooses to proceed to buy the quoted coverage, then a process of assisting the buyer in buying the coverage may be invoked. An example of such a process is shown in FIG. 8.

FIG. 8 shows a process of buying coverage on personal property, and it may be invoked after the buyer has been given a quote as described previously in connection with FIG. 7.

At 802, the buyer may be asked to enter a description of the personal property to be insured. For example, the buyer may be presented with a screen that contains a box into which a textual description may be entered. As one example, if the buyer wants to insure a diamond ring, the buyer could enter into the box: "Ladies diamond ring, center stone weight 1.5 karat, with tiffany setting." As another example, the screen may offer the buyer the opportunity to attach or upload a document that contains the description. For example, if the buyer has previously obtained an appraisal or a bill of sale for the item, or has a photograph of the item, such documents could be uploaded as the description (or as part of the description). A combination of attachments and entered text could be used—e.g., a photograph of a diamond ring could be uploaded, accompanied by a textual description that could be entered.

At the time that the buyer enters or attaches the description, the buyer may be given the chance to update the value. For example, when the buyer went through the initial quote process (e.g., the process shown in FIG. 7), the buyer may have entered $5,000 as the value of a diamond ring to be insured. When the buyer is asked to provide a description of the ring, the buyer may, in the process of providing the description, use an appraisal or bill of sale and discover that the ring is worth $6,000. Thus, the buyer can provide a revised estimate of the value based on that information.

At 804, the buyer may be presented with a verification page, showing the description entered, and the value of property to be insured. The value shown may reflect any revisions to the value, as previously described. If the value of property to be insured has been revised, the screen may contain an indication that the information has been updated, and the buyer may be given a chance to approve the update. (E.g., there could be the words "coverage updated", shown in an attention-drawing color, to focus the buyer's attention on the fact that there has been a change.) Web-site users often reject a process that shows unexplained changes from screen to screen. Therefore advising the buyer of the update may tend to increase acceptance of the process, and may lower the incidence of buyers aborting the on-line process in favor of talking to a human representative.

At 806, the buyer may be asked to accept terms of coverage. For example, the buyer may be presented with a statement saying: "To be eligible for this product, your property must be used solely for personal purposes, and in the event of a loss, you will need to provide proof of ownership and value." The buyer can then be presented with a check box next to a statement, such as "I agree to the terms and conditions." The buyer can indicate assent to the statement by checking the box, and clicking a button marked with text such as "next" or "submit".

At 808, the buyer is asked to sign (or "electronically sign") relevant documents relating to coverage. For example, the buyer may be presented with a simple statement, such as: "I have read and understand the documents linked below," where the screen presenting that statement contains links to legal documents, such as an insurance agreement and/or a fraud warning. The buyer can be asked to check a box on the screen, indicating assent. Buyers often tend to abort an on-line process that asks them to read and accept lengthy or onerous legal terms, so making the statements that the buyer is asked to assent to short and simple (as in 806 and 808) may tend to increase the buyer's acceptance of the on-line process—which again tends to lower the incidence of buyers aborting the on-line process in favor of a human representative. However, any types of statements and/or documents may be presented at 806 and/or 808.

At 810, a screen may be presented to the buyer confirming the policy start date. For example, for whatever day the coverage is purchased, the screen may show the next calendar day as the policy's start date. It may also show the value of property to be insured under the policy, and may also show the monthly and/or annual premium for the policy. It may be the case that the policy start date is set to the next day by default and cannot be changed by the buyer. For example, a service representative may be able to view the buyer's policy under a similar screen, but with certain enhanced capabilities such as being able to change the start date (e.g., to prevent the buyer from starting coverage in the past). However, in another example, the buyer could be given the chance to select a start date (perhaps under some constraints, such as a rule that the buyer choose a start date in the future rather than in the past).

Additionally, it should be noted that, after the policy has been purchased and time progresses, a buyer may update the amount of coverage to reflect factors such as depreciation or inflation. Since much of valuable personal property (such as jewelry) tends not to depreciate but rather to increase in value with inflation, the user may be offered the chance, at a subsequent visit to a web site, to update the amount of coverage. For example, the user could visit the site to renew the policy, and the site could examine the last date on which a value for property was entered, and then use a cost index (e.g., an inflation index) to update the amount of coverage. The user can then accept the new amount, and records can be updated to indicate that the prior insured value of an item of personal property has been superseded by an updated value.

Figure 9:
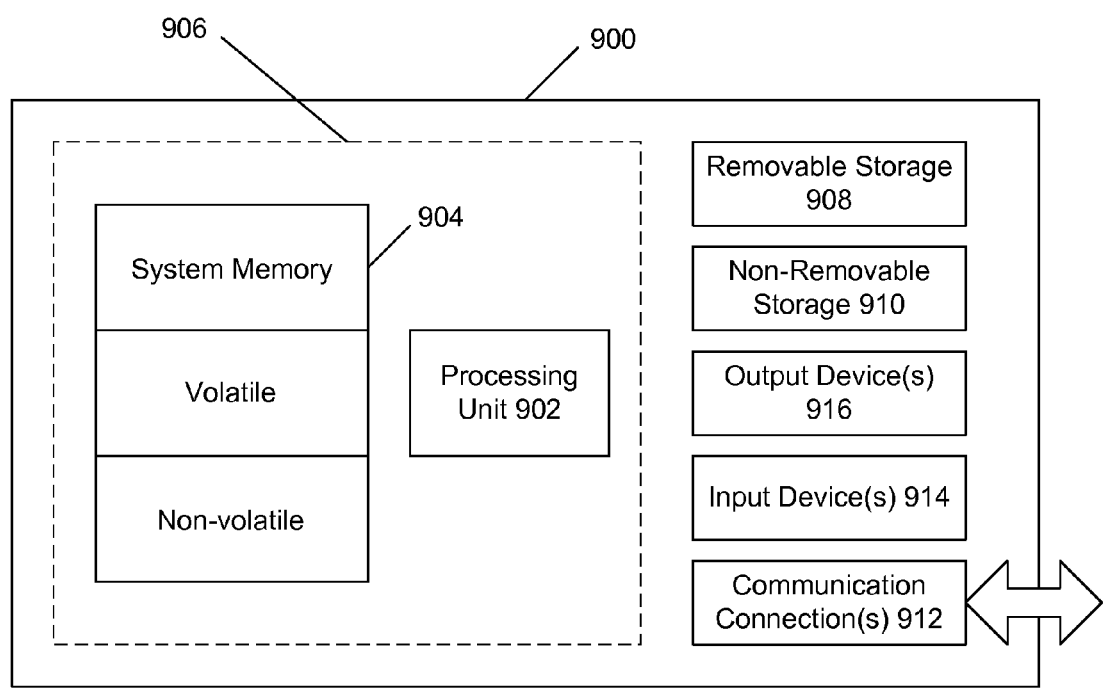
FIG. 9 is a block diagram of an example computing environment in which example embodiments and aspects may be implemented.

The subject matter described herein may be implemented through the use of a computer system, or other type of device that has some computing mechanism(s). FIG. 9 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an example system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by computing device 900 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 904, removable storage 908, and non-removable storage 910 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium that can be used to store the desired information and can be accessed by computing device 900. Any such computer storage media may be part of computing device 900.

Computing device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 900 may also have input device(s) 914 such as keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

The invention claimed is:

1. A system for providing a price to insure personal property, said system comprising:
 a processor;
 a computer-readable medium coupled to the processor and storing a plurality of instructions, which, when executed, cause the processor to provide the price to insure the personal property, the plurality of instructions comprising:
 instructions that cause the processor to display a plurality of categories of personal property;
 instructions that cause the processor to receive, from a user, a selection of at least one category of the plurality of categories of personal property;

instructions that cause the processor to receive, from the user, an indication of value of personal property to be insured in the at least one category of the plurality of categories of personal property;

instructions that cause the processor to consult a database of policyholders;

instructions that cause the processor to determine, based on said database, that said user has a homeowner's insurance policy with an organization that is being requested to issue personal property insurance on said personal property;

instructions that cause the processor to retrieve location information associated with said user from data associated with said homeowner's insurance policy;

instructions that cause the processor to provide, to said user, the price to insure said personal property based on said indication of value and on said location information; and instructions that cause the processor to communicate, to said user, an explanation of a difference between insuring said personal property though said homeowner's insurance policy and insuring said personal property though a personal property insurance policy.

2. The system of claim 1, further comprising:
instructions that cause the processor to communicate, to said user, educational content that comprises at least one image of an item that falls within said at least one of said categories.

3. The system of claim 1, wherein said personal property falls within a fine arts category, wherein the system further comprises:
instructions that cause the processor to retrieve a fire rating based on said location information wherein said price is further based on said fire rating.

4. The system of claim 1, further comprising:
instructions that cause the processor to receive, from said user, a description of said personal property.

5. The system of claim 4, wherein said description is received in the form of an image of a document that describes said personal property.

6. The system of claim 1, further comprising:
instructions that cause the processor to receive, from said user, a name;
instructions that cause the processor to persist said name and said price; and
instructions that cause the processor to subsequently retrieve said price using said name.

7. A method of providing a price to insure personal property, the method comprising:
providing a computer having a processor and memory;
displaying a plurality of categories of personal property;
receiving, from a user, a selection of at least one category of the plurality of categories of personal property;
receiving, from the user, an indication of value of personal property to be insured in the at least one category of the plurality of categories of personal property;
consulting a database of policyholders using the processor;
determining, based on said database and using the processor, that said user has a homeowner's insurance policy with an organization that is being requested to issue personal property insurance on said personal property;
retrieving, using the processor, location information associated with said user from data associated with said homeowner's insurance policy;
providing, to said user, said price to insure said personal property based on said indication of value and on said location information; and
communicating, to said user, an explanation of a difference between insuring said personal property though said homeowner's insurance policy and insuring said personal property though a personal property insurance policy.

8. The method of claim 7, further comprising:
communicating, to said user, educational content that comprises at least one image of an item that falls within said at least one of said categories.

9. The method of claim 7, wherein said personal property falls within a fine arts category, wherein the method further comprises:
retrieving a fire rating based on said location information, wherein said price is further based on said fire rating.

10. The method of claim 7, further comprising:
receiving, from said user, a description of said personal property.

11. The method of claim 10, wherein said description is received in the form of an image of a document that describes said personal property.

12. The method of claim 7, further comprising:
receiving, from said user, a name;
persisting said name and said price using the processor; and
subsequently retrieving said price using said name.

13. A non-transitory computer-readable medium comprising computer-readable instructions for providing a price to insure personal property, said computer-readable instructions being executed by a computer and comprising instructions to:
display a plurality of categories of personal property;
receive, from a user, a selection of at least one category of the plurality of categories of personal property;
receive, from the user, an indication of value of personal property to be insured in
the at least one category of the plurality of categories of personal property; consult a database of policyholders;
determine, based on said database, that said user has a homeowner's insurance policy with an organization that is being requested to issue personal property insurance on said personal property;
retrieve location information associated with said user from data associated with said homeowner's insurance policy;
provide, to said user, said price to insure said personal property based on said indication of value and on said location information; and
communicate, to said user, an explanation of a difference between insuring said personal property though said homeowner's insurance policy and insuring said personal property though a personal property insurance policy.

14. The non-transitory computer-readable medium of claim 13, further comprising instructions that:
communicate, to said user, educational content that comprises at least one image of an item that falls within at least one of said categories.

15. The non-transitory computer-readable medium of claim 13, wherein said personal property falls within a fine arts category, wherein the computer-readable instructions further comprise instructions that:
retrieve a fire rating based on said location information wherein said price is further based on said fire rating.

16. The non-transitory computer-readable medium of claim 13, further comprising instructions that:
receive, from said user, a description of said personal property.

17. The non-transitory computer-readable medium of claim 16, wherein said description is received in the form of an image of a document that describes said personal property.

18. The non-transitory computer-readable medium of claim 13, further comprising instructions that:

receive, from said user, a name;
persist said name and said price; and
subsequently retrieve said price using said name.

* * * * *